(12) United States Patent
Burghardt et al.

(10) Patent No.: US 8,443,676 B2
(45) Date of Patent: May 21, 2013

(54) PRESSURE SENSOR FOR HYDRAULIC MEDIA IN MOTOR VEHICLE BRAKE SYSTEMS

(75) Inventors: Roland Burghardt, Frankfurt an Main (DE); Carsten Zahout-Heil, Darmstadt (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 816 days.

(21) Appl. No.: 12/063,780

(22) PCT Filed: Aug. 23, 2006

(86) PCT No.: PCT/EP2006/065602
§ 371 (c)(1),
(2), (4) Date: Jun. 7, 2010

(87) PCT Pub. No.: WO2007/023168
PCT Pub. Date: Mar. 1, 2007

(65) Prior Publication Data
US 2010/0263452 A1    Oct. 21, 2010

(30) Foreign Application Priority Data

Aug. 23, 2005  (DE) .......................... 10 2005 030 980
Aug. 23, 2006  (DE) .......................... 10 2006 039 422

(51) Int. Cl.
*G01L 9/12* (2006.01)
(52) U.S. Cl.
USPC ............................................. 73/724; 73/715
(58) Field of Classification Search
USPC ........................................... 73/715, 718, 724
See application file for complete search history.

(56) References Cited

U.S. PATENT DOCUMENTS

| 4,064,550 A | 12/1977 | Dias et al. |
| 5,564,434 A * | 10/1996 | Halperin et al. ............... 600/488 |
| 6,003,378 A | 12/1999 | Scherr et al. |
| 6,209,398 B1 * | 4/2001 | Fowler et al. .................... 73/724 |

(Continued)

FOREIGN PATENT DOCUMENTS

| DE | 19963786 | 7/2001 |
| DE | 10212947 | 9/2003 |
| DE | 10323297 | 12/2003 |

OTHER PUBLICATIONS

Fonseca, M., et al.: Wireless Micromachined Ceramic Pressure Sensor for High-Temperature Applications. In: Journal of Microelectromechanical Systems, vol. 11, No. 4 of Aug. 2002, pp. 337-343, Fig. 1.

*Primary Examiner* — Max Noori
(74) *Attorney, Agent, or Firm* — Brinks Hofer Gilson & Lione

(57) ABSTRACT

Disclosed is a pressure sensor, especially for measuring pressures exceeding 100 bar, with a diaphragm (1, 1') that can be deflected and/or deformed as a result of pressurization. It has an enclosed hollow volume (6) that is disposed below the diaphragm and in particular is at least partly filled with a gas or a mixture of gas. A supporting frame (2) for the diaphragm sealingly closes the periphery of the diaphragm relative to a base member (3), and at least one pressure transducer converts the deflection and/or deformation of the diaphragm into at least one electric quantity. It uses a capacitive, piezoresistive or any other principle or at least one strain measuring strip, in which case the pressure sensor is sealingly encapsulated on all sides and has no electric contacts or lines leading to the outside.

12 Claims, 2 Drawing Sheets

U.S. PATENT DOCUMENTS

| | | | |
|---|---|---|---|
| 7,017,416 B1 * | 3/2006 | Liu et al. | 73/702 |
| 7,129,828 B2 * | 10/2006 | Cook | 340/447 |
| 7,213,465 B2 | 5/2007 | Benzel et al. | |
| 7,252,008 B2 | 8/2007 | Muchow et al. | |
| 7,290,454 B2 * | 11/2007 | Liu | 73/753 |
| 7,698,952 B2 * | 4/2010 | Renken et al. | 73/780 |
| 7,726,184 B2 * | 6/2010 | Cook et al. | 73/146.5 |
| 7,730,772 B2 * | 6/2010 | Cook et al. | 73/146.5 |
| 2004/0133092 A1 | 7/2004 | Kain | |
| 2004/0155785 A1 * | 8/2004 | Okubo et al. | 340/626 |
| 2006/0144155 A1 * | 7/2006 | Liu | 73/753 |

* cited by examiner

PRESSURE SENSOR FOR HYDRAULIC MEDIA IN MOTOR VEHICLE BRAKE SYSTEMS

BACKGROUND OF THE INVENTION

The present invention relates to a pressure sensor according to the preamble of claim 1 and to its use.

Document DE 199 63 786 A1 discloses a pressure sensor which is principally apt for use in an electronically controlled brake system to determine the pressure of a hydraulic fluid. The sensor mainly consists of a semiconductor layer applied to a boron silicate glass. When pressure is applied to the sensor, mechanical stress in the material is produced between the layers, which stress can be measured on account of the piezoelectric effect by appropriately fitted electric electrodes. Due to the materials employed, the pressure sensor known from the above document cannot be used for aggressive media without an additional protective measure, such as embedding into silicon.

In view of the above, the invention has for its object to provide a pressure sensor which is especially well suited for the above-mentioned application and which is characterized by a particularly great resistance against aggressive media.

SUMMARY OF THE INVENTION

The invention achieves this object by a pressure sensor, which in particular does not require being embedded into a protective material.

The invention relates to a pressure sensor, especially for measuring pressures exceeding 100 bar, with a diaphragm that can be deflected and/or deformed as a result of pressurization. Below the diaphragm is an enclosed (first) hollow volume which in particular is at least partly filled with a gas or a mixture of gas. The diaphragm is substantially even (in the absence of a difference in pressure) and bears against a supporting frame for the diaphragm, which tightly closes the periphery of the diaphragm relative to a base member, on which the supporting frame is abutting. The supporting frame can be manufactured or fitted separately, or it can be part of the configuration of the base member or the diaphragm surface. The pressure sensor includes at least one pressure transducer which converts the deflection and/or deformation of the diaphragm into at least one electric quantity according to the capacitive, piezoresistive or any other principle or by means of at least one strain measuring strip. The pressure sensor is sealingly encapsulated on all sides and has no electric contacts or lines leading to the outside.

The sealing encapsulation on all sides offers the advantage that a long useful life of the sensor is achieved even under rough humid environmental conditions. More particularly, the sensor is apt for use in fluids, with particular preference in aggressive media.

When the sensor is designed with a capacitor structure, at least one electrically conductive measuring electrode is disposed in the area of the diaphragm surface so that it is moved by the deformable diaphragm surface. In addition, a back plate electrode is provided which is attached to the base member and forms a capacitor along with the measuring electrode. The pressurization alters the deflection of the diaphragm and, thus, the distance of the capacitor plates. The change in capacity entailed can be taken into account as an indicator of the pressure.

Preferably, the diaphragm surface includes a substantially non-deformed part which is placed in the vicinity of the rim, for example, that is equipped with a reference electrode permitting a capacitive reference measurement in conjunction with the back plate electrode or an additional back plate electrode. Including the reference measurement allows enhancing the precision of pressure measurement, and disturbance variables can be compensated, respectively.

Preferably, the base member and/or the supporting frame are/is at least partly made of a corrosion-resistant material, especially on the basis of plastics or metal or ceramics. The diaphragm preferably consists of either metal, plastics or a ceramic material. Furthermore, the mentioned materials may include small quantities of other materials as long as the desired corrosion-resistance is not impaired thereby to a substantial degree.

More particularly, the diaphragm consists of a ceramic material, the pressure-responsive deflection of which is especially preferred to be determined capacitively. It is, however, also possible and therefore provided as an alternative preferred embodiment to equip the pressure sensor of the invention with electric conductor structures which can be resistively varied under pressure and to provide an electric signal this way which can be varied by the pressurization.

It is suitable that the diaphragm is a pressure measuring plate.

Preferably the diaphragm surface is part of the housing.

When the sensor of the invention is manufactured on the basis of ceramics, especially substantially in full, the advantage that results is a particularly great resistance against aggressive measuring media such as brake fluid subjected to high pressure. Possible materials for deformation bodies are also ceramics, metal, glass, but also plastics.

According to an alternatively preferred embodiment, the rate of pressurization is measured with resistively pressure-responsive measuring structures which are connected to the electronic unit rather than in a capacitive way. The piezoresistive effect or the change in shape of the resistive structure induced by expansion is preferably used in the embodiment of the sensor with a resistive measuring structure. In the sensor according to the piezoresistive principle, the deformation body is preferably formed of silicon in a monolithic fashion. The actual measuring elements are then implanted especially into the pressure measuring plate. Mechanical stress is produced in the diaphragm and/or the pressure measuring plate when pressure is introduced.

The resistive structures can be produced as a thin film or thick film. The resistive structures are, however, especially preferred to be applied as a thick film material.

It is expedient that the sensor in the housing includes a signal processing unit for processing the at least one electric output quantity of the pressure transducer.

Preferably, the sensor includes a signal processing unit that is electrically connected to the corresponding structures in order to process the capacitor voltage or in the case of the resistive conductors. This signal processing unit is especially devised as a user-specific integrated circuit.

Furthermore, the sensor is preferred to comprise a transmitting device for the wireless transmission of pressure information, which device is connected to the signal processing unit or is integrated therein. To this end, the sensor utilizes especially an additional antenna structure integrated into the sensor and/or an antenna structure which is an electrode of the capacitor structure in particular. This is advantageous because, compared to prior art pressure sensors, no corrosion-sensitive electric contacts to the outside are required.

Preferably, the sensor is laid out for an especially periodical measurement and/or data transmission at defined times. The layout of the sensor for a constant measurement and/or data transmission is alternatively expedient.

Wireless data transmission is adequately known. There are systems in which the sensor has an internal energy source (battery) and systems in which the sensor uses an external electromagnetic field to feed itself, making use of this energy for the periodic transfer of its values.

It is common to all systems that they require an antenna for transmission and generally comprise a signal pre-processing unit and a high-frequency component.

The signal processing unit preferably has an integrated design, as has been stated before.

Suitably, the sensor has a cylindrical configuration, and the cylinder height is especially preferred to be smaller than the cylinder diameter.

According to another preferred embodiment of the sensor, the base member along with the abutment surface and diaphragm forms a first hollow space and, in addition, it forms another hollow space together with a cover arranged opposite to the diaphragm side and a recess which is indented into the base member also opposite to the diaphragm, in which case the signal processing unit is integrated in the second hollow space.

According to the other preferred embodiment, the second hollow space of the sensor preferably accommodates an antenna structure which is positioned in particular on the inside surface of the cover.

Furthermore, the invention relates to the use of the previously described sensors in motor vehicle control devices, especially in motor vehicle brake control devices. It is also preferred to use the sensor in directly measuring tire pressure control systems.

Further preferred embodiments can be seen in the following description of an embodiment by way of Figures.

DETAILED DESCRIPTION OF THE DRAWINGS

Figure 1:
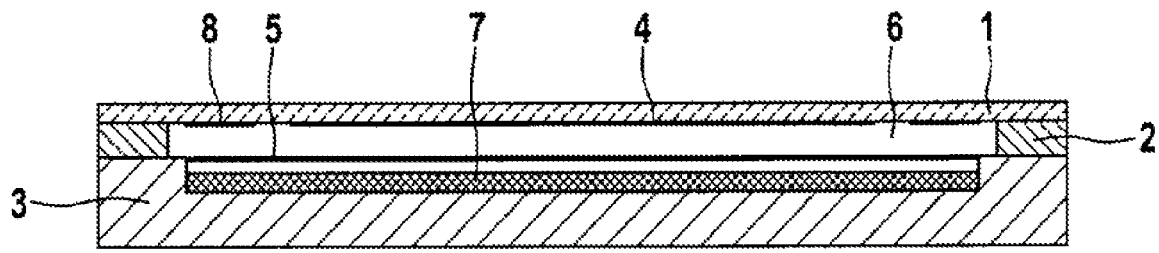
FIG. 1 is a schematic cross-sectional view of a capacitive pressure sensor with a hollow space.

The capacitive pressure sensor in FIG. 1 consists of a deformable ceramic diaphragm 1 which is seated on a base member 3 made of ceramics by way of a ring with solder paste 2. In a middle surface area of the diaphragm 1 which is oriented inwards to the hollow space 6, a first metallic capacitor plate 4 (measuring electrode) is rigidly connected to the diaphragm. Likewise oriented towards the hollow space 6 is a second metallic capacitor plate 5 on the surface of the base member 3 (back plate electrode). Placed in the outside area of the inwards oriented diaphragm surface, that means adjacent to the measuring electrode 4, is an additional reference electrode 8 that is electrically isolated from the measuring electrode. The size of the back plate electrode 5 is such that it lies opposite to the measuring electrode 4 and to the reference electrode 7. Ring with solder paste 2 provides an annular supporting frame for diaphragm 1 on base member 3. The second capacitor plate 5 is directly connected to ASIC 7.

ASIC 7 contains a user-specific integrated circuit which is connected to the capacitor plates 4, 5 and to reference electrode 8 in an electrically conducting manner. It is also possible according to an example not shown that the back plate electrode is united with ASIC 7, or is directly formed by ASIC which also carries the primary signal processing unit. The processed signals are conducted to the outside using a lead frame. The housing is closed by a cemented cover, made of metal of also ceramics, for example.

Figure 2:
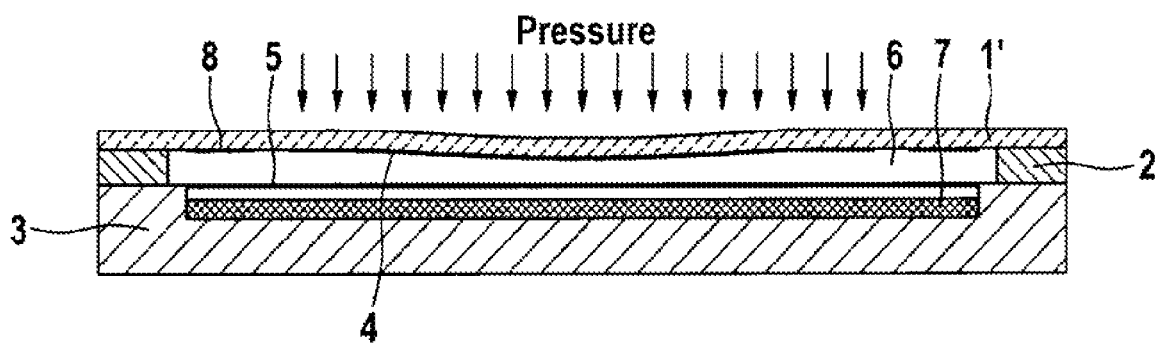
FIG. 2 shows the pressure sensor according to FIG. 1 when subjected to pressure.

FIG. 2 shows the pressure sensor in FIG. 1 with a diaphragm 1' deformed by pressurization. The distance of the capacitor plates 4 and 5 reduces due to the pressure-induced deflection of the diaphragm. The result is an electrically measurable increase of the capacity of the capacitor consisting of the capacitor plates 4, 5.

Figure 3:
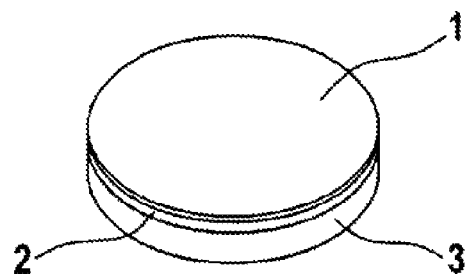
FIG. 3 the pressure sensor according to FIGS. 1 and 2 in a three-dimensional view.

FIG. 3 is a three-dimensional view illustrating the capacitive pressure sensor according to FIGS. 1 and 2.

Figure 4:
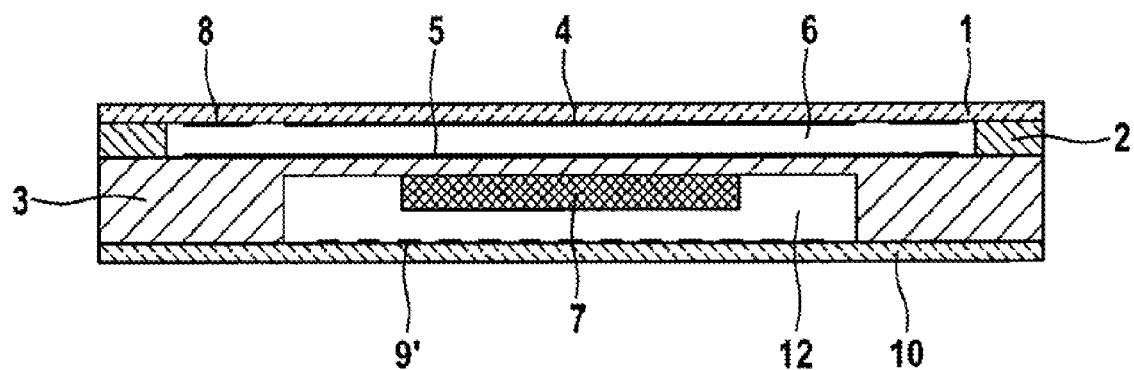
FIG. 4 is a second example for a pressure sensor with two hollow spaces.

FIG. 4 represents an example for a sensor with an antenna structure 9 and an additional hollow space 12. The antenna structure described in FIG. 4 can also be provided in the sensor according to FIGS. 1 to 3 as envisaged in an example (not shown).

Antenna structure 9 adjacent to the measuring electrode 4 is fitted on the inside surface of diaphragm 1. Antenna structure 4 has a spiral-shaped design. It can be applied in the shape desired by means of a thin-film (CVD (Chemical Vapor Deposition) process, sputtering) process or a thick-film process. Likewise, the antenna structure can be applied by means of lithographic processes with a subsequent etching operation. The antenna structure 4 is electrically connected to ASIC 7 using appropriate joints of the cover (not shown). Both cementing and soldering operations are feasible.

In addition to the antenna structure 4, additional components such as HF components can be mounted on the surface of diaphragm 1.

The embodiment in FIG. 4 shows a sensor with another hollow space 12 which is designed as a recess on the opposite side of base member 3. Hollow space 12 is closed by a bottom cover 10. ASIC 7 can be arranged in the bottom hollow space 12. Antenna structure 9 is placed in the hollow space 12 at cover 10. ASIC 7 is connected to the antenna structure 9 or to the electrodes 4, 5 and 8 either by way of bond wires or by way of other suitable linking technologies.

In the sensor according to FIG. 4, the components antenna structure 9 and ASIC 7 with integrated HF transmitter are jointly integrated into the housing of the pressure sensor. Encapsulation of the sensor on all sides is achieved hereby.

Figure 5:
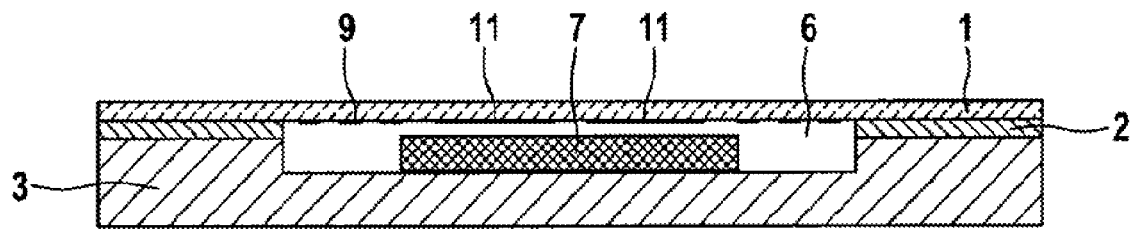
FIG. 5 shows an illustration of the sensor according to FIG. 1 including a signal processing circuit and an antenna structure.

The sensor according to FIG. 5 differs from the previously explained sensors in that resistive layers 11 are substituted for the capacitor plates. The arrangement of ASIC 7 in the hollow space 6 corresponds to the exemplary non-illustrated embodiment of a sensor according to FIG. 1 with ASIC. Resistive layers 11 are applied to diaphragm 1 by means of thin-film or thick-film technologies. It is also possible to cement per se known silicon elements which are appropriate for the measurement of deformations onto the diaphragm 1. Hollow spaces 6 and 12 can be filled with oil or, alternatively, with any other material.

The sensor includes a pressure measuring plate instead of a diaphragm in an embodiment not shown.

The invention claimed is:

1. A pressure sensor with a diaphragm configured to be deflected or deformed as a result of pressurization, with an enclosed hollow volume disposed below the diaphragm, a supporting frame for the diaphragm which sealingly closes the periphery of the diaphragm relative to a base member, and with at least one pressure transducer which converts the deflection or deformation of the diaphragm into at least one electric quantity, the diaphragm further including a substantially non-deformed part carrying a reference electrode permitting a capacitive reference measurement in conjunction with a back plate electrode, the pressure sensor being sealingly encapsulated on all sides and having no electric contacts or lines leading to the outside, and at least one of the base member and the supporting frame being at least in part made of a of plastic or ceramic material and the diaphragm consisting of plastic or ceramic material.

2. The pressure sensor as claimed in claim 1, further comprising that the pressure transducer of the sensor operates according to the capacitive principle, and the sensor includes at least one electrically conductive measuring electrode moved by the diaphragm, wherein the back plate electrode is attached to the base member, the back plate electrode and the measuring electrode forming a capacitor.

3. A motor vehicle control device comprising the pressure sensor of claim 1.

4. The control device as claimed in claim 3, wherein the control device is a brake control device.

5. The pressure sensor as claimed in claim 1,
further comprising that the sensor houses a signal processing unit configured to process the at least one electric output quantity of the pressure transducer.

6. The pressure sensor as claimed in claim 5,
further comprising that the sensor comprises a transmitting device for the wireless transmission of pressure information, which device is connected to the signal processing unit or is integrated therein.

7. The pressure sensor as claimed in claim 6,
further comprising that the sensor comprises an additional antenna structure integrated into the sensor, the additional antenna structure utilizing a capacitor structure.

8. The pressure sensor as claimed in claim 1, further comprising that the diaphragm is part of the housing.

9. The pressure sensor as claimed in claim 1,
further comprising that the sensor has a cylindrical configuration, and the cylinder height is smaller than the cylinder diameter.

10. The pressure sensor as claimed in claim 1,
further comprising that the signal processing unit has an integrated design.

11. The pressure sensor as claimed in claim 1,
further comprising that the base member along with the abutment surface and diaphragm forms a first hollow space and that the base member has a recess indented into the base member opposite the diaphragm and a cover arranged opposite the diaphragm, the recess and the cover forming a second hollow space, the signal processing unit being integrated in the second hollow space.

12. The pressure sensor as claimed in claim 11,
further comprising that the second hollow space accommodates an antenna structure positioned on an inside surface of the cover.

* * * * *